US006738480B1

(12) United States Patent
Berthault et al.

(10) Patent No.: US 6,738,480 B1
(45) Date of Patent: May 18, 2004

(54) METHOD AND DEVICE FOR CANCELLING STEREOPHONIC ECHO WITH FREQUENCY DOMAIN FILTERING

(75) Inventors: Frédéric Berthault, Jouy en Josas (FR); François Capman, Versailles (FR)

(73) Assignee: Matra Nortel Communications, Quimper (FR)

( * ) Notice: Subject to any disclaimer, the term of this patent is extended or adjusted under 35 U.S.C. 154(b) by 0 days.

(21) Appl. No.: 09/569,604

(22) Filed: May 10, 2000

(30) Foreign Application Priority Data

May 12, 1999 (FR) .......................................... 99 06087

(51) Int. Cl.$^7$ ................................................ H04B 3/20
(52) U.S. Cl. .................... 381/66; 381/12; 381/94.3; 379/406.13; 370/290; 708/322
(58) Field of Search ................................ 381/66, 11, 12, 381/94.2, 94.3; 379/406.08, 406.12, 406.13, 406.01; 370/290; 708/322

(56) References Cited

U.S. PATENT DOCUMENTS 5,828,756 A * 10/1998 Benesty et al. ............... 381/66

FOREIGN PATENT DOCUMENTS

EP      0 841 799      5/1998

OTHER PUBLICATIONS

Benesty et al. "Stereophonic Acoustic Echo Cancellation Using Nonlinear Transformations and Comb Filtering", Acoustics, Speech, and Signal Processing, 1998. ICASSP '98. Proceedings of the 1998 IEEE Inter. Conf, vol. 6, May 12–15, 1998 pp. 367 3676.*

Makino et al. "Subband Stereo Echo Canceller Using the Projection Algorithm with Fast Convergence to the True Echo Path", Signal Processing Magazine, IEEE, vol. 14 Issue: 5, Sep. 1997 pp. 30–57.*

Hirano et al. "Convergence Analysis of Stereophonic Echo Canceller with Pre–processing—Relation between Pre–processing and Convergence", Acoustics, Speech, and SP, 1999. ICASSP '99. Pro. 1999 IEEE Inter. Conf, vol. 2, Mar. 15–19, 1999 pp 861–864.*

F Alberge et al., <<A Combined FDAF/WSAF Algorithm for Stereophonic Acoustic Echo Cancellation>>, Proceedings of the 1998 IEEE International Conference on Acoustics, Speech and Signal Processing, ICASSP 1998, Washington, USA, vol. 3, pp. 1413–1416.

J Benesty et al., <<Adaptive Filtering Algorithms for Stereophonic Acoustic Echo Cancellation>>, 1995 International Conference on Acoustics, Speech, and Signal Processing (IEEE ISCASSP). Conference Proceedings, Detroit, USA, May 1995, vol. 5, pp. 3099–3102.

H Akihiro et al., <<DSP Implementation and Performance Evaluation of a Compact Stereo Echo Canceller>>, Proceedings of the International Conference on Acoustics, Speech, and Signal Processing (ICASSP), New York, USA, IEEE, vol. Conf. 19, 1994, pp. II–245–248.

J J Shynk et al., <<Frequency Domain and Multirate Adaptive Filtering>>, IEEE SP Magazine, Jan. 1992, pp. 15–37.

(List continued on next page.)

Primary Examiner—Xu Mei
Assistant Examiner—Con P. Tran
(74) Attorney, Agent, or Firm—Top, Pruner & Hu, P.C.

(57) ABSTRACT

The filtering coefficients of a frequency domain stereophonic echo canceller are adapted by a method which takes account of the cross-correlation between the input signals relating to the two channels. In particular, the adaptation process takes account of the coherence function, reducing the problems commonly encountered with stereophonic cancellation schemes when relatively correlated input signals occur.

24 Claims, 3 Drawing Sheets

OTHER PUBLICATIONS

F Amand et al., <<Multi–Channel Acoustic Echo Cancellation>>, 4$^{th}$ International Workshop on Acoustic Echo and Noise Control, Roros, Norway, Jun. 1993, pp. 57–60.

M M Sondhi et al., <<Stereophonic Acoustic Echo Cancellation—An Overview of the Fundamental Problem>>, IEEE Signal Processing Letters, vol. 2, No. 8, Aug. 1995, pp. 148–151.

A Hirano et al., <<A Compact Multi–Channel Echo Canceller With a Single Adaptative Filter Per Channel>>, Proceedings IEEE Int. Symp. Circuits Syst. (ISCAS), San Diego, California, USA, vol. 4, 1992, pp. 1922–1925.

S Minami et al., <<A Stereophonic Echo Canceller Using Single Adaptive Filter>>, IEEE, Jan. 1992, pp. 3027–3030.

J Benesty et al., <<A Hybrid Mono/Stereo Acoustic Echo Canceller>>, IEEE Workshop on Application of Signal Processing and Acoustics (WASPAA '97).

P Heitkamper et al., "Stereophonic and Multichannel Hands–Free Speaking", Proc. 4$^{th}$ International Workshop on Acoustic Echo and Noise Control, Roros, Jun. 1995, pp. 53–56.

M Glanz et al., <<Speech Recognition in Cars With Noise Suppression and Car Radio Compensation>>, 22$^{nd}$ ISATA, Florence, Italy, May 14–18, 1990, pp. 509–516.

F Berthault et al., <<Stereophonic Acoustic Echo Cancellation—Application to Speech Recognition: Some Experimental Results>>, IWAENC 1997, 5$^{th}$ International Workshop on Acoustic Echo and Noise Control, London, Sep. 1997, pp. 96–99.

J Boudy et al., <<A Globally Optimised Frequency–Domain Acoustic Echo Canceller for Adverse Environment Application>>, 4$^{th}$ International Workshop on Acoustic Echo and Noise Control, Roros, Norway, Jun. 1995, pp. 95–98.

J Benesty et al., <<A Better Understanding and an Improved Solution to the Specific Problems of Stereophonic Acoustic Echo Cancellation>>, IEEE Transactions on Speech and Audio Processing, vol. 6, No. 2, Mar. 1998, pp. 156–165.

\* cited by examiner

METHOD AND DEVICE FOR CANCELLING STEREOPHONIC ECHO WITH FREQUENCY DOMAIN FILTERING

BACKGROUND OF THE INVENTION

The present invention relates to acoustic echo cancellers which process stereophonic input signals in the frequency domain.

Acoustic echo occurs whenever there is a strong coupling between a microphone and a loudspeaker. The microphone then picks up a delayed and attenuated version of the input signal broadcast in the acoustic space by the loudspeaker. Stereophonic echo, or more generally multi-channel acoustic echo, is referred to when the microphone simultaneously picks up echoes from several loudspeakers.

Acoustic echo cancellers generally model the acoustic path between each loudspeaker and the microphone by means of an adaptive filter whose coefficients are updated by stochastic gradient algorithms: NLMS ("Normalised Least Mean Squares"), APA ("Affine Projection Algorithm"), FDAF ("Frequency Domain Adaptive Filter"), etc., or exact least squares algorithms: RLS ("Recursive Least Squares").

It is commonly acknowledged that the performance of adaptive filtering algorithms deteriorates if multi-channel acoustic echo cancellation systems are implemented in the presence of highly correlated input signals (see F. Amand et al. "Multi-channel acoustic echo cancellation", Proc. 4th International Workshop on Acoustic Echo and Noise Control, Roros, June 1995, pages 57–60; M. Mohan Sondhi et al., "Stereophonic Acoustic Echo Cancellation—An Overview of the Fundamental Problem", IEEE Signal Processing Letters, Vol. 2, No. 8, August 1995, pages 148–151). Various solutions have been proposed in an attempt to overcome this problem:

- using monophonic filters (A. Hirano et al., "A Compact Multi-Channel Echo Canceller with a single Adaptive Filter per Channel", Proc. ICASSP 1992, pages 1922–1925; S. Minami, "A Stereophonic Echo Canceller Using Single Adaptative Filter", Proc, ICASSP 1995, pages 3027–3030);
- modifying time gradient algorithms (F. Amand et al., "Un algorithme d'annulation d'écho stéréo de type LMS prenant en compte l'inter-corrélation des entrées", Fifteenth GRETSI conference, Juan-les-Pins, September 1995, pages 407–410; J, Benesty et al, "Un algorithme de projection à deux voies avec contraintes—Application à l'annulation d'écho acoustique stéréophonique", Fifteenth GRETSI conference, Juan-les-Pins, September 1995, pages 387–390);
- de-correlating signals before broadcasting them (J. Benesty et al., "A Hybrid Mono/Stereo Acoustic Echo Canceller", IEEE Workshop on application of signal processing and acoustics (WASPAA'97)).

The echo cancellers according to the invention find applications in multi-channel communication systems in particular in video-conferencing systems (see P. Heitkamper et al., "Stereophonic and multichannel Hands-Free Speaking", Proc. 4th International Workshop on Acoustic Echo and Noise Control, Roros, June 1995, pages 53–56; Y. Mahieux et al., "Annulation d'écho en téléconférence stéréophonique", 14th GRETSI, Juan-les-Pins, September 1993, pages 515–518), in hands-free telephones and in speech recognition systems (see M. Glanz et al., "Speech Recognition In Cars With Noise Suppression and Car Radio Compensation", 22nd ISATA, Florence, May 1990, pages 509–516; F. Berthault et al., "Stereophonic Acoustic Echo Cancellation—Application to speech recognition: Some experimental results", 5th International Workshop on Acoustic Echo and Noise Control, London, September 1997, pages 96–99).

Frequency domain stereophonic echo cancellers implement a method wherein first and second input signals ($x_1$, $x_2$) are applied to an echo generator system and an observation signal (z) is picked up at an output of said system, the input signals being digitally sampled and processed in successive blocks of 2N samples with frequency domain transformation according to a set of 2N frequencies. In accordance with this method, the processing of a block of 2N samples comprises the steps of:

transforming the first input signal from the time domain to the frequency domain to obtain a vector $\underline{X}_1$ having 2N complex components relating to the set of 2N frequencies, including spectral components of the first input signal relating to a sub-set of the set of 2N frequencies;

transforming the second input signal from the time domain to the frequency domain to obtain a vector $\underline{X}_2$ having 2N complex components relating to the set of 2N frequencies, including spectral components of the second input signal relating to said sub-set of frequencies;

multiplying term by term the vector $\underline{X}_1$ by a vector $\underline{H}_1$ of 2N complex coefficients to produce first estimated spectral echo components relating to the frequencies of the sub-set;

multiplying term by term the vector $\underline{X}_2$ by a vector $\underline{H}_2$ of 2N complex coefficients to produce second estimated spectral echo components relating to the frequencies of the sub-set;

adding the first and second estimated spectral echo components relating to each frequency of the sub-set to obtain a spectral component belonging to a vector of 2N estimated spectral total echo components;

transforming the vector of 2N estimated spectral total echo components from the frequency domain to the time domain to obtain an estimated total echo;

subtracting the estimated total echo from the observation signal to produce an error signal;

transforming the error signal from the time domain to the frequency domain to obtain a vector $\underline{E}$ of 2N spectral components of the error signal relating to the set of 2N frequencies; and updating the vectors $\underline{H}_1$ and $\underline{H}_2$ for the processing of the next block, on the basis of the vectors $\underline{X}_1$, $\underline{X}_2$ and $\underline{E}$.

In the known systems, said sub-set of frequencies represents the entire set of 2N frequencies.

Usually (stereophonic FDAF algorithm), the updating of the vectors $\underline{H}_1$ and $\underline{H}_2$ for the processing of the next block takes account of the energy gradient of the error signal, estimated by $\underline{\nabla}_i = \underline{X}^*_i \otimes \underline{E}$ for the vector $\underline{H}_i$ (i=1 or 2), where $\otimes$ denotes the term-by-term product of two vectors and (*) denotes complex conjugation.

The gradient is generally normalised: $\underline{\nabla}_{Ni} = \underline{B}_i \otimes \underline{\nabla}_i$ for i=1 or 2, where $\underline{B}_i$ is a vector of size 2N, whose term corresponding to a frequency f is the inverse of the spectral energy $P_{ii}(f)$ of the i-th input signal evaluated at the frequency f (in other words, $P_{ii}(f) = <X_i(f).X_i(f)^*>$ is a current average of $|X_i(f)|^2 = X_i(f).X_i(f)^*$, where $X_i(f)$ is the component of the vector $\underline{X}_i$ relating to the frequency f).

In addition, a constraint is often placed on the normalised gradient in order to retain only the linear convolution terms in the frequency calculation of the gradients: $\underline{\nabla}_{Ci} = \underline{\underline{C}} \cdot \underline{\nabla}_{Ni}$ for i=1 or 2, where $\underline{\underline{C}}$ denotes a constant constraint matrix.

The echo estimation filters are finally adapted by $\underline{H}_i(k+1) = \underline{H}_i(k) + \mu \cdot \underline{\nabla}_{Ci}(k)$ for i=1 or 2, the index k numbering the successive analysis blocks. The coefficient $\mu$, lying between 0 and 1, is the adaptation step.

It is noted that each processing channel is subjected to a separate adaptation determined by the error signal and the input signal relating to this channel. This explains the identification errors which might be made by the algorithm in the presence of correlated input signals: two estimation errors for the vectors $\underline{H}_1$ and $\underline{H}_2$ can compensate for one another in the error signal while the algorithm is unable to correct them.

An object of the present invention is to propose another method of adapting stereophonic frequency filters which allows a certain degree of correlation between the signals to be taken into account.

SUMMARY OF THE INVENTION

Accordingly, the invention proposes a method as outlined above, further comprising computing a spectral energy $P_{11}(f)$ of the first input signal, a spectral energy $P_{22}(f)$ of the second input signal, an inter-spectral energy $P_{12}(f)$ of the first and second input signals and a coherence value $\Gamma(f)$ for each of the frequencies f in the set of 2N frequencies. According to that method, the updating of the vector $\underline{H}_1$ for the processing the next block is performed on the basis of a modified gradient in the form:

$$\underline{\nabla}_{M1} = \underline{A}_{11} \otimes \underline{\nabla}_1 + \underline{A}_{12} \otimes \underline{\nabla}_2 = (\underline{A}_{11} \otimes \underline{X}^*_1 + \underline{A}_{12} \otimes \underline{X}^*_2) \otimes \underline{E} \quad (1)$$

where $\underline{A}_{11}$ denotes a vector of size 2N whose component relating to a frequency f is $$\frac{1}{P_{11}(f) \cdot (1 - G(f))}$$

and $\underline{A}_{12}$ denotes a vector of size 2N whose component relating to a frequency f is $$\frac{-G(f)}{P_{12}(f) \cdot (1 - G(f))}$$

G(f) being an increasing real function of the coherence value $\Gamma(f)$ such that $0 \leq G(f) < 1$. On the other hand, the updating of the vector $\underline{H}_2$ for the processing the next block is performed on the basis of a modified gradient in the form:

$$\underline{\nabla}_{M2} = \underline{A}_{22} \otimes \underline{\nabla}_2 + \underline{A}^*_{12} \otimes \underline{\nabla}_1 = (\underline{A}_{22} \otimes \underline{X}^*_2 + \underline{A}^*_{12} \otimes \underline{X}^*_1) \otimes \underline{E} \quad (2)$$

where $\underline{A}_{22}$ denotes a vector of size 2N whose component relating to a frequency f is $$\frac{1}{P_{22}(f) \cdot (1 - G(f))}$$

Another aspect of the present invention relates to a stereophonic echo canceller arranged to implement a method as defined above.

Normalisation of the gradient takes account of crossed terms between the two channels, with a weighting determined by the coherence between the two input signals. This approach to adapting the filter coefficients represented by the components of $\underline{H}_1$ and $\underline{H}_2$ may be derived from a "block Newton" type of algorithm, expressed in the frequency domain, with limited hypotheses on the form of the signal correlation matrices.

In a preferred embodiment of the method, the spectral energies $P_{11}(f)$ and $P_{22}(f)$ are respectively averages of $|X_1(f)|^2$ and $|X_2(f)|^2$ and the inter-spectral energy $P_{12}(f)$ is an average of $\rho \cdot X_1(f) \cdot X_2(f)^*$, where $X_1(f)$ and $X_2(f)$ respectively represent the components of the vectors $\underline{X}_1$ and $\underline{X}_2$ relating to the frequency f and $\rho$ is a real coefficient such that $0 < \rho \leq 1$. This coefficient $\rho$ allows crossed terms to be accounted for to a greater or lesser degree when adapting the filters. If $\rho$ approaches 0, one tends to the conventional stereophonic FDAF algorithm. If $\rho = 1$, any correlation of the input signals is fully taken into account.

A priori, the function G(f) may be equal to the coherence value r(f). However, it is preferable to choose a non-linear function of this coherence value.

Said sub-set of frequencies for which echo cancellation is applied by the above method may represent the full set of 2N frequencies.

In an advantageous variant of the method, this sub-set of frequencies consists of frequencies for which the first and second input signals verify a correlation criterion.

Accordingly, a hybrid mono/stereophonic echo canceller can be provided, which will decide dynamically whether each frequency must be put through monophonic processing (relatively correlated signals) or stereophonic processing (not so highly correlated signals).

To this end, the components of the vectors $\underline{X}_1$ and $\underline{X}_2$ relating to the frequencies in the set of 2N frequencies which do not belong to said sub-set are zero, and vectors $\underline{X}'_1$ and $\underline{X}'_2$ of 2N complex components are formed, the components of said vectors $\underline{X}'_1$ and $\underline{X}'_2$ being zero for the frequencies of said sub-set and respectively equal to the spectral components of the first and second input signals for the frequencies of the set of 2N frequencies which do not belong to said sub-set. One of the vectors $\underline{X}'_1$ and $\underline{X}'_2$ is selected and multiplied term by term by a vector $\underline{H}'$ to obtain estimated spectral monophonic echo components for the frequencies in the set of 2N frequencies not belonging to said sub-set, and the vector of 2N estimated spectral total echo components is completed with said estimated spectral monophonic echo components. The vector $\underline{H}'$ is typically updated on the basis of a gradient term proportional to the product term by term of the vector $\underline{E}$ and the selected vector $\underline{X}'_1$ or $\underline{X}'_2$.

The selected vector $\underline{X}'_1$ or $\underline{X}'_2$ is preferably the one which is ahead of the other in time, so as to verify the causality condition.

The correlation criterion used may be evaluated by means of the coherence value computed for each of the frequencies in the set of 2N frequencies.

It should be noted that the latter embodiment may generally be applied to any stereophonic echo cancellation scheme in the frequency domain but also in the time domain (in full band or with a sub-band decomposition). After a frequency analysis of the correlations between the input signals, an echo cancellation of the stereophonic type can be applied to the frequencies for which the analysis reveals a weak correlation and an echo cancellation of the monophonic type to the frequencies for which the analysis reveals a strong correlation. Such hybrid echo canceller offers greater flexibility than hybrid echo cancellers which use a fixed frequency limit with a stereophonic scheme at the low frequencies and a monophonic scheme at the high frequencies (see J. Benesty et al., "A Hybrid Mono/Stereo Acoustic Echo Canceller", IEEE Workshop on application of signal processing and acoustics (WASPAA'97)).

In the case of a full band correlation analysis, the proposed hybrid technique allows an appropriate echo cancellation scheme (mono or stereo) to be adopted on a dynamic basis. This will therefore get round the problems encountered with stereophonic systems if the input signals are correlated (a monophonic scheme will then be applied).

According to another aspect, the invention proposes a stereophonic echo canceller wherein first and second input signals are applied to an echo generator system and an observation signal is obtained at an output of said system, comprising means for processing said signals in digitally sampled form including:

means for stereophonically filtering two signals respectively obtained from the first and second input signals;

means for monophonically filtering a signal obtained from the first and second input signals;

means for obtaining an estimated echo of the input signals from the outputs of the stereophonic and monophonic filtering means;

means for subtracting the estimated echo from the observation signal and producing an error signal;

adaptation means for updating the stereophonic and monophonic filtering means on the basis of the input signals and the error signal; and means for analysing correlations between the first and second input signals in order to identify first portions of the two input signals in which they are relatively de-correlated and second portions of the two input signals in which they are more correlated than in the first portions in order to apply two signals constructed respectively from the first portions of the two input signals to the stereophonic filtering means and in order to apply a signal constructed from the second portions of one of the two input signals to the monophonic filtering means.

Said first and second portions of the input signals are understood to be time portions and/or frequency portions. The stereophonic and monophonic filtering means preferably operate in the frequency domain but may also operate in the time domain.

DESCRIPTION OF PREFERRED EMBODIMENTS

Figure 1:
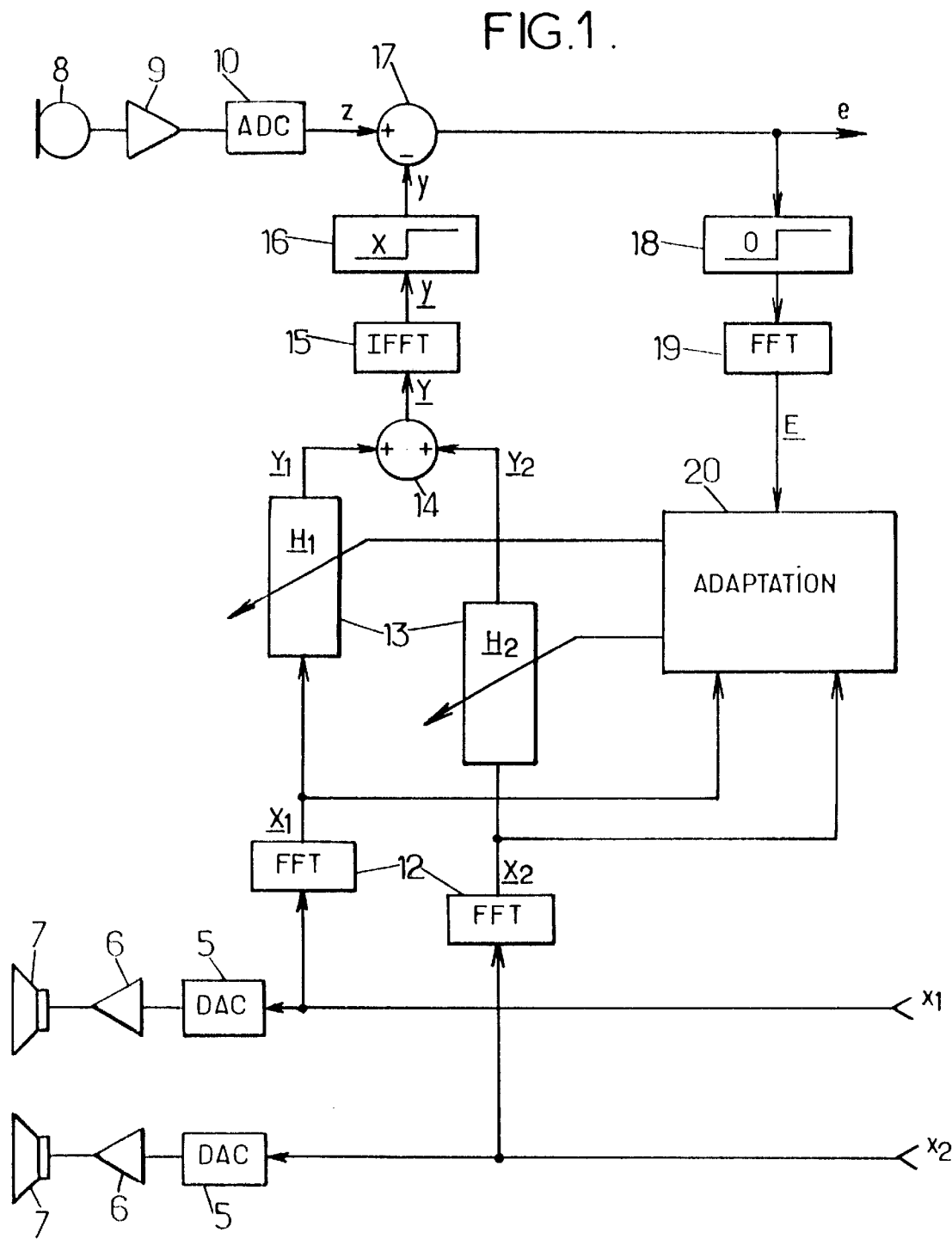
FIG. 1 is a block diagram of a stereophonic echo canceller implementing the invention.

The echo canceller illustrated in FIG. 1 is provided in an acoustic system comprising two sound restoration channels to which two digital input signals $x_1$, $x_2$ are respectively applied. For each channel i (i=1, 2), the signal $x_i$ is converted to analogue at 5 and then amplified at 6 before being fed to the loudspeaker 7.

The system also has one or more microphones 8, whose output signals are amplified at 9 and digitised at 10 to produce one or more digital signals z referred to as observation signals.

The echo canceller is used to modify an observation signal z in order to withdraw therefrom echo components of the input signals $x_1$, $x_2$, which may have been generated due to acoustic coupling between the loudspeakers 7 and the microphone 8. If the system comprises several sound pickup channels issuing several observation signals z, an echo canceller may be provided in each sound pick-up channel.

As is common practice, the echo canceller may be set up by programming a commercially available digital signal processor (DSP) or by designing an application-specific integrated circuit (ASIC).

In the example described here, the echo canceller uses the so-called "overlap-and-save" method (OLS) to perform linear convolution in the frequency domain. Assuming the digital filters modelling the echo paths to be finite impulse response filters with N coefficients, respectively $h_1(1), \ldots, h_1(N)$ and $h_2(1), \ldots, h_2(N)$, the input signals $x_1$ and $x_2$ are processed in successive blocks of 2N samples. For a typical sampling frequency of $F_e$=8 kHz, the number N may range from several hundred to several thousand. The successive blocks of the input signals, of a size 2N, have mutual overlaps of N samples; the k-th block of signal $\underline{x}_i$ (i=1 or 2), obtained after receiving the sample $x_i(n)$ of rank n=k×N, is expressed as:

$$\underline{x}_i = \underline{x}_i(k) = [x_i(n-2N+1), \ldots, x_i(n-N), x_i(n-N+1), \ldots, x_i(n-1), x_i(n)]^T$$

In the notations used here:

the signals indicated by a lowercase letter represent real signals in the time domain, the signals indicated by an uppercase letter represent complex signals in the frequency domain;

the index k between parentheses, most often implicit, denotes the index of the current block of size 2N;

underlined notations represent column vectors of size 2N;

double-underlined notations represent square matrices of size 2N×2N.

It will be noted that, in a known manner, the overlap between blocks of 2N samples could be more than N samples. This allows the adaptation frequency of the filters to be increased and the delay caused by the processing of a block to be decreased, the price for this being increased complexity.

Two fast Fourier transform modules 12 convert the blocks of the input signals $x_1$ and $x_2$ to the frequency domain. Alternatively, the echo canceller could use other domain transforms (discrete cosine transform, fast Hartley transform, . . . ). If $\underline{\underline{W}}$ is the matrix of the fast Fourier transform of size 2N, the modules 12 produce, for i=1 or 2, vectors given by:

$$\underline{X}_i = \underline{X}_i(k) = \underline{\underline{W}} \cdot \underline{x}_i = [X_i(0), X_i(1), \ldots, X_i(2N-1)]^T = [X_i(0,k), X_i(1,k), \ldots, X_i(2N-1,k)]^T$$

The filters 13 perform the convolutions in the frequency domain, by multiplying each vector $\underline{X}_i$ term by term by a corresponding vector $\underline{H}_i$ of 2N complex coefficients equal to:

$$\underline{H}_i = \underline{H}_i(k) = \underline{\underline{W}} \cdot [h_i(1), h_i(2), \ldots, h_i(N), 0, \ldots, 0]^T$$

The resulting vectors $\underline{Y}_i = \underline{Y}_i(k) = \underline{X}_i \otimes \underline{H}_i$ are summed at 14 to obtain a vector $\underline{Y}$ of 2N estimated spectral total echo components.

An inverse Fourier transform is applied to this vector $\underline{Y}$ by module 15, which restores a block $\underline{y} = \underline{\underline{W}}^{-1} \cdot \underline{Y}$ of 2N time samples. The first N samples of the block $\underline{y}$ are discarded by module 16 which keeps only the last N samples $y(n-N+1), \ldots, y(n-1), y(n)$. A subtractor 17 subtracts these N samples of the estimated total echo y from the corresponding samples of the observation signal z. The result is an error signal e forming the output signal of the echo canceller after possible additional shaping operations.

In accordance with the OLS technique, the N samples $e(n-N+1), \ldots, e(n-1), e(n)$ of the error signal e issued by the subtractor 17 when processing a block k are converted into a block of size 2N by a module 18 which prefixes the block with N zeros. Module 19 then applies a fast Fourier transform to the error signal block to produce a vector:

$$\underline{E} = \underline{E}(k) = \underline{\underline{W}}.[0, \ldots, 0, e(n-N+1), \ldots, e(n-1), e(n)]^T$$

The vector E as well as the vectors $\underline{X}_1$ and $\underline{X}_2$ relating to the current block are applied to an adaptation module 20, which updates the filter coefficients represented by the complex components of the vectors $\underline{H}_1$ and $\underline{H}_2$, for the processing of the next block k+1.

Figure 2:
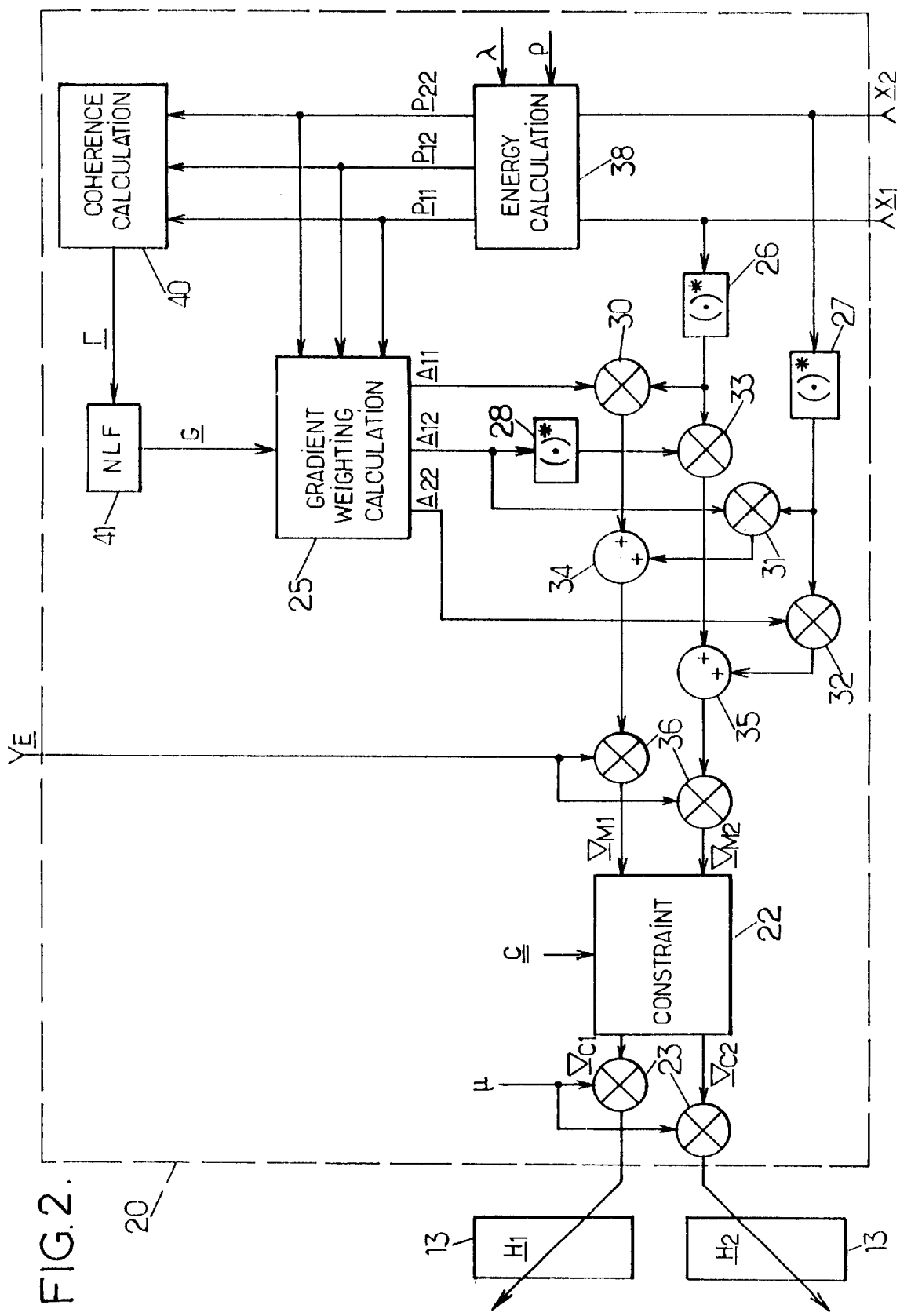
FIG. 2 is a block diagram of an adaptation module for the echo canceller illustrated in FIG. 1.

A possible embodiment of the adaptation module 20 in an echo canceller according to the invention is illustrated in FIG. 2. Modified gradients $\underline{\nabla}_{M1}$ and $\underline{\nabla}_{M2}$ are computed for both filters 13 using equations (1) and (2). In the example illustrated here, a constraint is placed on each of these modified gradients by a module 22 in order to take account of the fact that the 2N coefficients of the vector $\underline{H}_i$ represent only N coefficients of the impulse response. The constraint is applied by multiplying the vector $\underline{\nabla}_{Mi}$ by the projection matrix $\underline{\underline{C}} = \underline{\underline{W}}.\underline{\underline{J}}.\underline{\underline{W}}^{-1}$, where $\underline{\underline{J}}$ is the 2N×2N diagonal matrix whose N lower diagonal terms are 1s and whose N upper diagonal terms are 0s.

Multipliers 23 multiply the constrained gradients $\underline{\nabla}_i = \underline{\underline{C}}.\underline{\nabla}_{Mi}$ by the adaptation step $\mu$ and issue the corrective terms for the filtering coefficients: $\underline{H}_i(k+1) = \underline{H}_i(k) + \mu.\underline{\nabla}_{Ci}$.

The adaptation module 20 takes account (equations (1) and (2)) of gradient weighting vectors $\underline{A}_{11}, \underline{A}_{12}, \underline{A}_{22}$ determined by a unit 25. It comprises units 26–28 which produce the conjugated complexes of vectors $\underline{X}_1, \underline{X}_2$ and $\underline{A}_{12}$, and multiplier circuits 30–33 which respectively form the products term by term $\underline{X}^*_1 \otimes \underline{A}_{11}$, $\underline{X}^*_2 \otimes \underline{A}_{12}$, $\underline{X}^*_2 \otimes \underline{A}_{22}$ and $\underline{X}^*_1 \otimes \underline{A}_{12}$. The outputs of multiplier circuits 30 and 31 are summed at 34 and the outputs of multiplier circuits 32 and 33 are summed at 35. The components of the vectors produced by the adders 34 and 35 are multiplied term by term by those of the vector $\underline{E}$ by multiplier circuits 36, which give respectively the modified gradients $\underline{\nabla}_{M1}$ and $\underline{\nabla}_{M2}$.

In order to obtain the gradient weightings, the first step is to evaluate, at the current instant, the spectral $P_{11}(f)$, $P_{22}(f)$ and inter-spectral $P_{12}(f)$ energies of the input signals $x_1$ and $x_2$. This operation is performed by a unit 38 which averages the quantities $|X_1(f)|^2 = X_1(f).X_1(f)^*$, $|X_2(f)|^2 = X_2(f).X_2(f)^*$ and $\rho.X_1(f).X_2(f)^*$ over a signal window. These may be the arithmetic averages over a rectangular sliding window. In the example illustrated, they are exponential smoothing averages involving an forgetting factor $\lambda$ lying between 0 and 1:

$$P_{11}(f,k) = \lambda.P_{11}(f,k-1) + (1-\lambda).X_1(f,k).X_1(f,k)^* \quad (3)$$

$$P_{22}(f,k) = \lambda.P_{22}(f,k-1) + (1-\lambda).X_2(f,k).X_2(f,k)^* \quad (4)$$

$$P_{12}(f,k) = \lambda.P_{11}(f,k-1) + \rho.(1-\lambda).X_1(f,k).X_1(f,k)^* \quad (5)$$

It is noted that in equation (5), unit 38 takes account of an additional coefficient $\rho$ such that $0 < \rho \leq 1$. This coefficient makes it possible to control the degree to which crossed terms are taken into account when adapting the filters 13.

A unit 40 receives the energies $P_{11}(f)$, $P_{22}(f)$ and $P_{12}(f)$ evaluated by unit 38 for each of the 2N frequencies of the Fourier transform and estimates the coherence function $\Gamma(f)$ between the two input signals. This estimation may consists in taking, for each frequency f, i.e. at the resolution of the frequency domain transform:

$$\Gamma(f) = \frac{|P_{12}(f)|^2}{P_{11}(f) \cdot P_{22}(f)} \quad (6)$$

Unit 40 may also take account of a subdivision of the spectrum into sub-bands and take as the coherence value $\Gamma(f)$ for each frequency of a sub-band an average of the coherence function computed according to equation (6) over the sub-band. This sub-band division may be uniform. However, it may advantageously be non-uniform, e.g. using a Mel or Bark type of scale.

The 2N coherence values $\Gamma(f)$ produced by unit 40 are delivered to a unit 41, which applies a non-linear function to them to obtain values G(f).

In order to avoid too sudden variations in the filters, the function G(f) is limited so that the values it assumes are between 0 and $G_{max}$, where $0 < G_{max} < 1$. Furthermore, the function G(f) is advantageously such that G(f)=0 if $\Gamma(f) < \Gamma_{min}$, where $0 < \Gamma_{min} < 1$, so that a conventional adaptation will be applied to weakly correlated signals. A possible form is a piecewise linear function: G(f)=0 if $\Gamma(f) < \Gamma_{min}$; G(f)= $G_{max}$ if $\Gamma(f) > \Gamma_{max}$ where $\Gamma_{min} < \Gamma_{max} < 1$; and $$G(f) = G_{max} \frac{\Gamma(f) - \Gamma_{min}}{\Gamma_{max} - \Gamma_{min}}$$

if $\Gamma_{min} < \Gamma(f) < \Gamma_{max}$.

From the quantities G(f), $P_{11}(f)$, $P_{22}(f)$ and $P_{12}(f)$, the unit 25 computes the gradient weighting vectors $\underline{A}_{11}, \underline{A}_{11}, \underline{A}_{22}$ used in equations (1) and (2):

$$A_{11}(f) = \frac{1}{P_{11}(f) \cdot (1 - G(f))} \quad (7)$$

$$A_{12}(f) = \frac{-G(f)}{P_{12}(f) \cdot (1 - G(f))} \quad (8)$$

$$A_{22}(f) = \frac{1}{P_{22}(f) \cdot (1 - G(f))} \quad (9)$$

Equations (1) and (2), which allow a relatively simple implementation of the stereophonic filter adaptation, can be deduced by an approximation of a more general expression of the adaptation equations, derived from a "block Newton" type of algorithm:

$$\underline{H}_1(k+1) = \underline{H}_1(k) + \mu.\underline{\underline{C}}.[\underline{\underline{U}}_{11}.\underline{\nabla}_1 + \underline{\underline{U}}_{11}.\underline{\nabla}_2] \quad (10)$$

$$\underline{H}_2(k+1) = \underline{H}_2(k) + \mu.\underline{\underline{C}}.[\underline{\underline{U}}_{22}.\underline{\nabla}_2 + \underline{\underline{U}}_{21}.\underline{\nabla}_1] \quad (11)$$

In this expression (10)–(11), the matrices $\underline{\underline{U}}_{ij}$ are:

$$\underline{\underline{U}}_{11} = (\underline{\underline{R}}'_{11} - \underline{\underline{R}}'_{12}(\underline{\underline{R}}'_{22})^{-2}\underline{\underline{R}}'_{21})^{-1}$$

$$\underline{\underline{U}}_{12} = -\underline{\underline{R}}'_{12}(\underline{\underline{R}}'_{22})^{-1}\underline{\underline{U}}_{11}$$

$$\underline{\underline{U}}_{22} = (\underline{\underline{R}}'_{22} - \underline{\underline{R}}'_{21}(\underline{\underline{R}}'_{11})^{-2}\underline{\underline{R}}'_{12})^{-1}$$

$$\underline{\underline{U}}_{21} = -\underline{\underline{R}}'_{21}(\underline{\underline{R}}'_{11})^{-1}\underline{\underline{U}}_{22}$$

where the $\underline{\underline{R}}'_{ij}$ are correlation matrices of a size 2N×2N expressed in the frequency domain as: $\underline{\underline{R}}'_{ij} = \underline{\underline{W}}.\underline{\underline{R}}_{ij}.\underline{\underline{W}}^{-1}$, with $\underline{\underline{R}}_{ij}$ equal to the 2N×2N correlation matrix of the input signals $x_i$ and $x_j$.

The approximation whereby equations (1)–(2) become expression (10)–(11) implies the hypotheses: (i) that each input signal is perfectly de-correlated by the Fourier transform; and (ii) that the two input signals are mutually de-correlated at different frequencies. The crossed terms, caused by the presence of the inter-spectral energy $P_{12}(f)$ in equations (6) and (8), remain to take account of the correlation which the input signals might have at a same frequency. With these two hypotheses, the matrixes $\underline{\underline{U}}_{11}$, $\underline{\underline{U}}_{12}$, $\underline{\underline{U}}_{22}$ and $\underline{\underline{U}}_{21}$ may be approximated by diagonal matrices, whose diagonal terms are those of the vectors $\underline{A}_{11}$, $\underline{A}_{12}$, $\underline{A}_{22}$ and $\underline{A}^{*}_{12}$ respectively.

Figure 3:
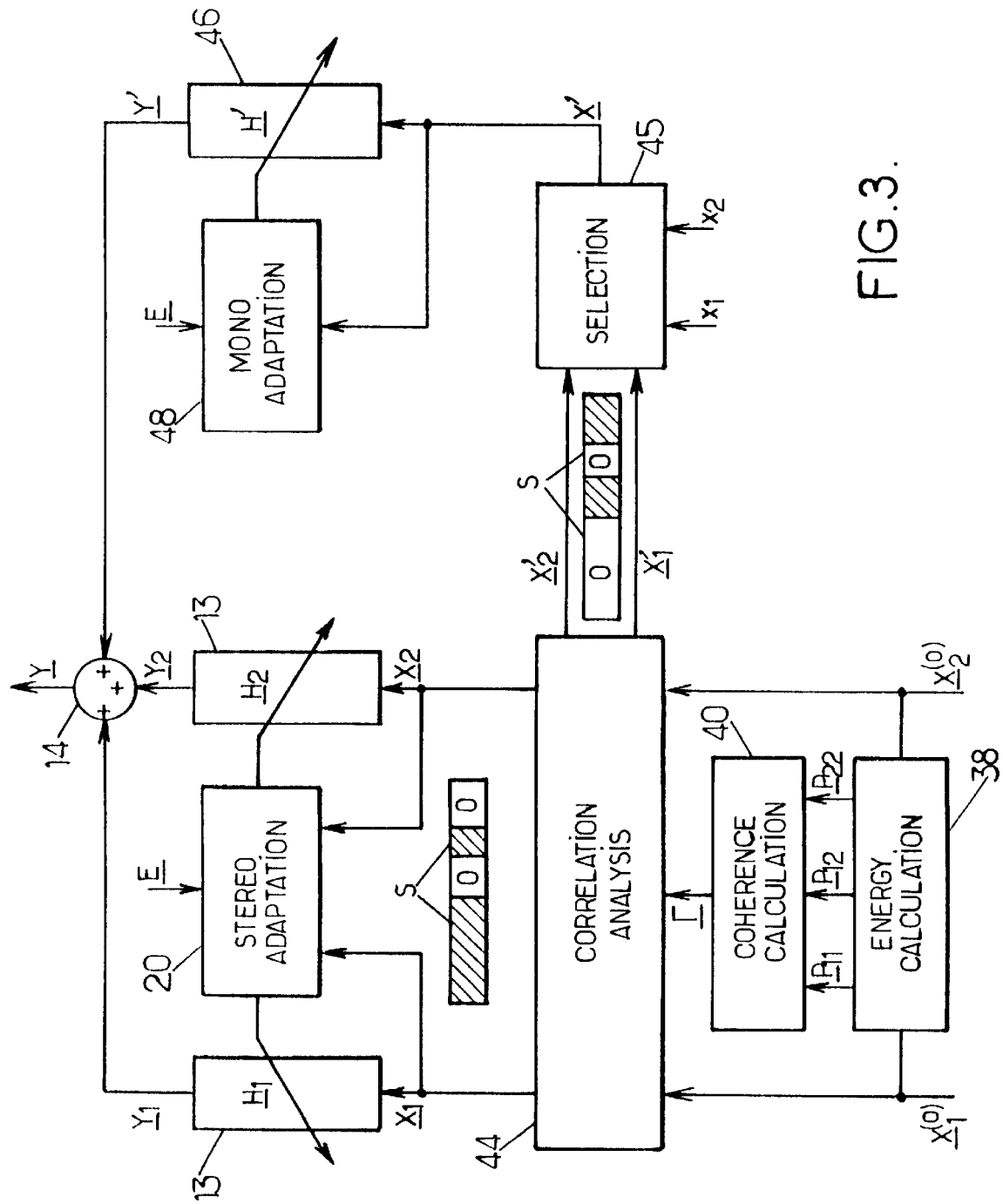
FIG. 3 is a block diagram of a hybrid mono/stereophonic echo canceller implementing the invention.

In the example illustrated in FIG. 3, the spectral component vectors $\underline{X}_1^{(0)}$ and $\underline{X}_2^{(0)}$ produced by the FFT modules 12 are delivered to a module 44 which analyses the correlations between the input signals. This module 44 determines a sub-set S of frequencies f for which the signals $x_1$ and $x_2$ are rather correlated. The corresponding spectral components are respectively placed in the vectors $\underline{X}_1$ and $\underline{X}_2$ fed to the stereophonic filters 13 and their adaptation module 20, which operate as in the example described above with reference to FIGS. 1 and 2. For those of the 2N FFT frequencies which do not belong to the sub-set S, the components of the vectors $\underline{X}_1$ and $\underline{X}_2$ fed to the filters 13 and the adaptation module 20 are set to zero.

The module 44 puts the spectral components of the signals $x_1$ and $x_2$ relating to the frequencies for which the input signals are rather correlated in vectors $\underline{X}'_1$ and $\underline{X}'_2$, in which the components relating to the frequencies in the sub-set S are set to zero. A module 45 selects a vector $\underline{X}'$ from these two vectors $\underline{X}'_1$ and $\underline{X}'_2$ and applies it to a monophonic filter 46.

The output vector $\underline{Y}'=\underline{H}'\otimes\underline{X}'$ of the monophonic filter 46 is added to the output vectors $\underline{Y}_1=\underline{H}_1\otimes\underline{X}_1$ and $\underline{Y}_2=\underline{H}_2\otimes\underline{X}_2$ of the stereo filters 13 by the adder 14. The resulting vector $\underline{Y}=\underline{Y}_1+\underline{Y}_2+\underline{Y}'$ is then processed as in the preceding example.

A monophonic adaptation module 48 handles the updating of filter 46 once each block has been processed, for example applying the FDAF algorithm:

$$\underline{H}'(k+1)=\underline{H}'(k)+\mu.\underline{C}.\underline{\nabla}'$$

where $\nabla'(f)=E(f).X'(f)^*/<X'(f).X'(f)^*>$.

A convenient way for the module 44 to analyse the correlations between the input signals is to rely on the coherence values $\Gamma(f)$ computed by the units 38 and 40 for each of the FFT frequencies f. Therefore, in the diagram of FIG. 3, it should be understood that the stereo adaptation module 20 does not re-calculate the energies $P_{11}(f)$, $P_{22}(f)$ and $P_{12}(f)$ and the coherence values $\Gamma(f)$ (see FIG. 2) but receives them from units 38 and 40 operating upstream of the analysis module 44.

In particular, the module 44 may use a threshold $T(f)$, which may be constant or depend on the frequency f, and decide that if $\Gamma(f)>T(f)$, the input signals are correlated at frequency f so that the components $X_1^{(0)}(f)$ and $X_2^{(0)}(f)$ are applied to the selection module 45, and otherwise that the input signals are de-correlated at frequency f so that the components $X_1^{(0)}(f)$ and $X_2^{(0)}(f)$ are applied to the stereo filters 13.

The correlation analysis by module 44 may be carried out for each FFT frequency f.

It may also be carried out at the resolution of a sub-band division of the frequency band of the signal: the coherence value $\Gamma(f)$ (or any other correlation measure) is integrated in each sub-band and the spectral components relating to all the frequencies of this sub-band are applied to the stereo filters 13 or to the selection module for the mono filter 46 depending on the integrated value obtained.

Alternatively, the correlation analysis may be carried out in full band: the vectors $\underline{X}_1^{(0)}$ and $\underline{X}_2^{(0)}$ are applied globally either to the selection module 45 or to the stereo filters 13, depending on whether the input signals appear to be more or less correlated.

In order to verify the causality hypothesis of the system, the vector $\underline{X}'$ selected by the module 45 is the one of the vectors $X'_1$ and $X'_2$ which corresponds to the input signal which is ahead of the other. One of several possible ways of making this selection is to examine the time correlations between the signals $x_1$ and $x_2$ over a sliding window of L samples as follows: first computing the correlations $$corr(\delta) = \sum_{t=0}^{L-1} x_1(n-t) \cdot x_2(n-t+\delta) \text{ for } -d \le \delta \le d$$

determining the number $\Delta$ ranging between $-d$ and $d$ which maximises $corr(\delta)$; and selecting the vector $X'_1$ if $\Delta>0$ and the vector $\underline{X}'_2$ if $\Delta<0$.

The module 45 may proceed with the selection at the rate of the blocks of size 2N or with a greater periodicity.

If, for a given frequency f, there is a shift from a situation where the input signals $x_1$, $x_2$ are considered as being de-correlated (stereo) to a situation where they are considered as being correlated (mono), the filter 46 can be initialised with regard to this frequency f by the sum of the stereo filter corresponding to the channel ahead and the stereo filter corresponding to the delayed channel, put back into phase. With the above-described selection mode, this means taking, at the instant of such transition: $H'(f)=H_1(f)+H_2(f).\exp(-2j\pi\Delta f/F_e)$ if $\Delta>0$, and $H'(f)=H_1(f).\exp(2j\pi\Delta f/F_e)+H_2(f)$ if $\Delta<0$.

For a transition in the other direction (mono→stereo), it is not possible to use the monophonic filter which has just been identified. There are several possible ways of re-initialising the stereo filters 13: resetting the coefficients $H_1(f)$ and $H_2(f)$ to zero or keeping the last coefficients $H_1(f)$ and $H_2(f)$ updated before the transition to monophonic filtering. The latter option is the one adopted in the above-described example because the module 20 adapts the stereo filters on the basis of the gradients $\underline{\nabla}_{M1}$ and $\underline{\nabla}_{M2}$ of equations (1) and (2), whose components are zero like those of the vectors $\underline{X}_1$ and $\underline{X}_2$ for the frequencies f which do not belong to the sub-set S.

We claim:

1. A method of cancelling stereophonic echo, wherein first and second input signals are applied to an echo generator system and an observation signal is picked up at an output of said system, the input signals being digitally sampled and processed in successive blocks of 2N samples with frequency domain transformation according to a set of 2N frequencies, wherein the processing of a block of 2N samples comprises the steps of:

transforming the first input signal from the time domain to the frequency domain to obtain a vector $\underline{X}_1$ having 2N complex components relating to the set of 2N frequencies, including spectral components of the first input signal relating to a sub-set of the set of 2N frequencies;

transforming the second input signal from the time domain to the frequency domain to obtain a vector $\underline{X}_2$ having 2N complex components relating to the set of 2N frequencies, including spectral components of the second input signal relating to said sub-set of frequencies;

multiplying term by term the vector $\underline{X}_1$ by a vector $\underline{H}_1$ of 2N complex coefficients to produce first estimated spectral echo components relating to the frequencies of the sub-set, multiplying term by term the vector $\underline{X}_2$ by a vector $\underline{H}_2$ of 2N complex coefficients to produce second estimated spectral echo components relating to the frequencies of the sub-set;

adding the first and second estimated spectral echo components relating to each frequency of the sub-set to obtain a spectral component belonging to a vector of 2N estimated spectral total echo components;

transforming the vector of 2N estimated spectral total echo components from the frequency domain to the time domain to obtain an estimated total echo;

subtracting the estimated total echo from the observation signal to produce an error signal;

transforming the error signal from the time domain to the frequency domain to obtain a vector $\underline{E}$ of 2N spectral components of the error signal relating to the set of 2N frequencies; and updating the vectors $\underline{H}_1$ and $\underline{H}_2$ for the processing of the next block, on the basis of the vectors $\underline{X}_1$, $\underline{X}_2$ and $\underline{E}$, the method further comprising the step of computing a spectral energy $P_{11}(f)$ of the first input signal, a spectral energy $P_{22}(f)$ of the second input signal, an inter-spectral energy $P_{12}(f)$ of the first and second input signals and a coherence value $\Gamma(f)$ for each of the frequencies f in the set of 2N frequencies, wherein the updating of the vector $\underline{H}_1$ for the processing the next block is performed on the basis of a modified gradient in the form $(\underline{A}_{11} \otimes \underline{X}^*_1 + \underline{A}_{12} \otimes \underline{X}^*_2) \otimes \underline{E}$, where $\otimes$ denotes the product of two vectors term by term, (*) denotes complex conjugation, $\underline{A}_{11}$ denotes a vector of size 2N whose component relating to a frequency f is $$\frac{1}{P_{11}(f) \cdot (1 - G(f))},$$

and $\underline{A}_{12}$ denotes a vector of size 2N whose component relating to a frequency f is $$\frac{-G(f)}{P_{12}(f) \cdot (1 - G(f))},$$

G(f) being an increasing real function of the coherence value $\Gamma(f)$ such that $0 < G(f) < 1$, and wherein the updating of the vector $\underline{H}_2$ for the processing the next block is performed on the basis of a modified gradient in the form $(\underline{A}_{22} \otimes \underline{X}^*_2 + \underline{A}_{12} \otimes \underline{X}^*_1) \otimes \underline{E}$, where $\underline{A}_{22}$ denotes a vector of size 2N whose component relating to a frequency f is $$\frac{1}{P_{22}(f) \cdot (1 - G(f))}.$$

2. A method as claimed in claim 1, wherein the computed coherence value $\Gamma(f)$ is in the form $$\Gamma(f) = \frac{|P_{12}(f)|^2}{P_{11}(f) \cdot P_{22}(f)}.$$

3. A method as claimed in claim 1, wherein the computed coherence value $\Gamma(f)$ is integrated by sub-bands according to a sub-band division the set of 2N frequencies.

4. A method as claimed in claim 3, wherein the sub-band division is non-uniform in the set of 2N frequencies.

5. A method as claimed in claim 1, wherein the spectral energies $P_{11}(f)$ and $P_{22}(f)$ are respectively averages of $|X_1(f)|^2$ and $|X_2(f)|^2$ and the inter-spectral energy $P_{12}(f)$ is an average of $\rho \cdot X_1(f) \cdot X_2(f)^*$, where $X_1(f)$ and $X_2(f)$ respectively represent the components of the vectors $\underline{X}_1$ and $\underline{X}_2$ relating to the frequency f and $\rho$ is a real coefficient such that $0 < \rho \leq 1$.

6. A method as claimed in claim 1, wherein the function G(f) assumes its values between 0 and $G_{max}$ where $0 < G_{max} < 1$.

7. A method as claimed in claim 1, wherein the function G(f) is such that $G(f) = 0$ if $\Gamma(f) < \Gamma_{min}$, where $0 < \Gamma_{min} < 1$.

8. A method as claimed in claim 6, wherein the function G(f) is such that $G(f) = 0$ if $\Gamma(f) < \Gamma_{min}$, such that $G(f) = G_{max}$ if $\Gamma(f) > \Gamma_{max}$, where $0 < \Gamma_{min} < \Gamma_{max} < 1$, and such that $$G(f) = G_{max} \frac{\Gamma(f) - \Gamma_{min}}{\Gamma_{max} - \Gamma_{min}}$$

if $\Gamma_{min} < \Gamma(f) < \Gamma_{max}$.

9. A method as claimed in claim 1, wherein said sub-set of frequencies represents the entire set of 2N frequencies.

10. A method as claimed in claim 1, wherein said sub-set of frequencies consists of frequencies for which the first and second input signals verify a correlation criterion.

11. A method as claimed in claim 10, comprising the step of evaluating the correlation criterion by means of the coherence value computed for each of the frequencies in the set of 2N frequencies.

12. A method as claimed in claim 10, wherein the components of the vectors $\underline{X}_1$ and $\underline{X}_2$ relating to the frequencies in the set of 2N frequencies which do not belong to said sub-set are zero, the method comprising the steps of: forming vectors $\underline{X}'_1$ and $\underline{X}'_2$ of 2N complex components, the components of said vectors $\underline{X}'_1$ and $\underline{X}'_2$ being zero for the frequencies of said sub-set and respectively equal to the spectral components of the first and second input signals for the frequencies of the set of 2N frequencies which do not belong to said sub-set; selecting one of the vectors $\underline{X}'_1$ and $\underline{X}'_2$; multiplying term by term the selected vector by a vector $\underline{H}'$ to obtain estimated spectral monophonic echo components for the frequencies in the set of 2N frequencies not belonging to said sub-set; and completing the vector of 2N estimated spectral total echo components with said estimated spectral monophonic echo components.

13. A method as claimed in claim 12, wherein the vector $\underline{H}'$ is updated on the basis of a gradient term proportional to the product term by term of the vector $\underline{E}$ and the selected vector $\underline{X}'_1$ or $\underline{X}'_2$.

14. A method as claimed in claim 12, wherein the selected vector $\underline{X}'_1$ or $\underline{X}'_2$ is the one which is ahead of the other in time.

15. A stereophonic echo canceller processing in digitally sampled form first and second input signals applied to an echo generator system and an observation signal obtained at an output of said system, comprising means for processing said signals, arranged to process the input signals in successive blocks of 2N samples with frequency domain transformation according to a set of 2N frequencies, the processing means including:

means for transforming a block of the first input signal from the time domain to the frequency domain to obtain a vector $\underline{X}_1$ having 2N complex components relating to the set of 2N frequencies, including spectral components of the first input signal relating to a sub-set of the set of 2N frequencies;

means for transforming a corresponding block of the second input signal from the time domain to the frequency domain to obtain a vector $\underline{X}_2$ having 2N complex components relating to the set of 2N frequencies, including spectral components of the second input signal relating to said sub-set of frequencies;

means for multiplying the vector $\underline{X}_1$ term by term by a vector $\underline{H}_1$ of 2N complex coefficients to produce first estimated spectral echo components relating to the frequencies of the sub-set;

means for multiplying the vector $\underline{X}_2$ term by term by a vector $\underline{H}_2$ of 2N complex coefficients to produce second estimated spectral echo components relating to the frequencies of the sub-set;

means for adding the first and second estimated spectral echo components relating to each frequency of the sub-set to obtain a spectral component belonging to a vector of 2N estimated spectral total echo components;

means for transforming the vector of 2N estimated spectral total echo components from the frequency domain to the time domain to obtain an estimated total echo;

means for subtracting the estimated total echo from the observation signal to produce an error signal;

means for transforming the error signal from the time domain to the frequency domain to obtain a vector $\underline{E}$ of 2N spectral components of the error signal relating to the set of 2N frequencies;

adaptation means for updating the vectors $\underline{H}_1$ and $\underline{H}_2$ for the processing of the next block on the basis of the vectors $\underline{X}_1$, $\underline{X}_2$ and $\underline{E}$; and means for computing a spectral energy $P_{11}(f)$ from the first input signal, a spectral energy $P_{22}(f)$ from the second input signal, an inter-spectral energy $P_{12}(f)$ from the first and second input signals and a coherence value $\Gamma(f)$ for each of the frequencies f in the set of 2N frequencies, wherein the vector $\underline{H}_1$ is updated for the processing of the next block by the adaptation means on the basis of a modified gradient in the form $(\underline{A}_{11} \otimes \underline{X}^*_1 + \underline{A}_{12} \otimes \underline{X}^*_2) \otimes \underline{E}$, where $\otimes$ denotes the product of two vectors term by term, (*) denotes complex conjugation, $\underline{A}_{11}$ denotes a vector of size 2N whose component relating to a frequency f is $$\frac{1}{P_{11}(f) \cdot (1 - G(f))},$$

and denotes a vector of size 2N whose component relating to a frequency f is $$\frac{-G(f)}{P_{12}(f) \cdot (1 - G(f))},$$

G(f) being an increasing real function of the coherence value $\Gamma(f)$ such that $0 < G(f) < 1$, and wherein the vector $\underline{H}_2$ is updated for the processing of the next block by the adaptation means on the basis of a modified gradient in the form $(\underline{A}_{22} \otimes \underline{X}^*_2 + \underline{A}^*_{12} \otimes \underline{X}^*_1) \otimes \underline{E}$, where $\underline{A}_{22}$ denotes a vector of size 2N whose component relating to a frequency f is $$\frac{1}{P_{22}(f) \cdot (1 - G(f))}.$$

16. A stereophonic echo canceller as claimed in claim 15, wherein the function G(f) is a non-linear function of the coherence value $\Gamma(f)$.

17. A stereophonic echo canceller as claimed in claim 15, wherein said sub-set of frequencies consists of frequencies for which the first and second input signals verify a correlation criterion, and wherein the frequencies of the set of 2N frequencies which do not belong to said sub-set are subjected to a monophonic filtering process to estimate spectral monophonic echo components which complete the vector of 2N estimated spectral total echo components.

18. A stereophonic echo canceller as claimed in claim 17, having means for evaluating the correlation criterion on the basis of the coherence value $\Gamma(f)$ computed for each of the frequencies in the set of 2N frequencies.

19. A stereophonic echo canceller processing in digitally sampled form first and second input signals applied to an echo generator system and an observation signal obtained at an output of said system, comprising:

means for stereophonically filtering two signals respectively obtained from the first and second input signals;

means for monophonically filtering a signal obtained from the first and second input signals;

means for obtaining an estimated echo of the input signals from the outputs of the stereophonic and monophonic filtering means;

means for subtracting the estimated echo from the observation signal and producing an error signal;

adaptation means for updating the stereophonic and monophonic filtering means on the basis of the input signals and the error signal; and means for analysing correlations between the first and second input signals in order to identify first portions of the first and second input signals and second portions of the first and second input signals whereby said first and second input signals are more correlated in the second portions than in the first portions wherein the two signals applied to the stereophonic filtering means are respectively constructed from the first portions of the first and second input signals, and wherein the signal applied to the monophonic filtering means is constructed from the second portion of one of the two input signals.

20. A stereophonic echo canceller as claimed in claim 19, wherein the stereophonic and monophonic filtering means operate in the frequency domain.

21. A stereophonic echo canceller as claimed in claim 19, wherein said first and second portions of the input signals comprise time portions of said input signals.

22. A stereophonic echo canceller as claimed in claim 19, wherein said first and second portions of the input signals comprise frequency portions of said input signals.

23. A stereophonic echo canceller as claimed in claim 19, wherein the analysing means use coherence values $\Gamma(f)$ between the first and second input signals to identify said first and second portions.

24. A stereophonic echo canceller as claimed in claim 19, wherein the input signal whose second portions are used to construct the signal applied to the monophonic filtering means is the one which is ahead of the other in time.

* * * * *

UNITED STATES PATENT AND TRADEMARK OFFICE
CERTIFICATE OF CORRECTION

PATENT NO. : 6,738,480 B1
DATED : May 18, 2004
INVENTOR(S) : Frederic Berthault and Francois Capman It is certified that error appears in the above-identified patent and that said Letters Patent is hereby corrected as shown below:

Column 11,
Line 49, "0<G(f)<1" should be -- 0≤G(f)<1 --
Line 52, "$\underline{A}_{12} \otimes \underline{X}^*_1)\otimes \underline{E}$" should read -- $\underline{A}^*_{12} \otimes \underline{X}^*_1)\otimes \underline{E}$ --

Column 13,
Line 53, before "denotes", insert -- $A_{12}$ --
Line 61, "0<G(f)<1" should be -- 0 ≤G(f)<1 --

Signed and Sealed this

Twenty-seventh Day of July, 2004

JON W. DUDAS
*Acting Director of the United States Patent and Trademark Office*